United States Patent [19]
Layotte et al.

[11] Patent Number: 4,564,083
[45] Date of Patent: Jan. 14, 1986

[54] DEVICE FOR GENERATING ACOUSTIC SHEAR WAVES IN THE EARTH

[75] Inventors: Pierre-Claude Layotte, Les Mathes; Jacques Cholet, L'Etang-la-Ville; Pierre Grolet, Orgerus; Roland Huin, Montesson, all of France

[73] Assignee: Institut Francais du Petrole, Rueil-Malmaison, France

[21] Appl. No.: 515,245

[22] Filed: Jul. 19, 1983

[30] Foreign Application Priority Data

Jul. 19, 1982 [FR] France .................. 82 12696

[51] Int. Cl.$^4$ .................. F16H 33/00; G01V 1/147
[52] U.S. Cl. .................. 181/114; 181/121; 181/401; 173/128; 173/139
[58] Field of Search .................. 181/114, 121, 401; 367/75; 124/56; 173/39, 89, 93.5, 94, 95, 128, 133, 139

[56] References Cited

U.S. PATENT DOCUMENTS

| | | | |
|---|---|---|---|
| 1,395,895 | 11/1921 | Bellony | 173/128 |
| 2,568,613 | 9/1951 | Daso | 173/128 |
| 2,740,488 | 4/1956 | Heaps | 181/121 |
| 2,740,489 | 4/1956 | White et al. | 181/112 |
| 4,050,540 | 9/1977 | Cholet et al. | 181/121 |
| 4,118,994 | 10/1978 | Layotte et al. | 367/75 |
| 4,291,780 | 9/1981 | Fulkerson | 181/114 |

FOREIGN PATENT DOCUMENTS 2642869 3/1977 Fed. Rep. of Germany ...... 181/121

Primary Examiner—Nelson Moskowitz
Attorney, Agent, or Firm—Millen & White

[57] ABSTRACT

The improved device for generating acoustic shear waves in the earth comprises a target member adapted to be coupled with the earth and provided with two lateral striking surfaces on which impinges a hammer pivotably mounted on a platform; the target member is connected through damping means to a cage supporting the platform, the hammer and its actuation means, said cage being displaceable with respect to the frame of a carrying vehicle between a position of contact with the earth of the target member and a lifted position thereof, the striking surfaces being inner walls of the target member.

8 Claims, 12 Drawing Figures

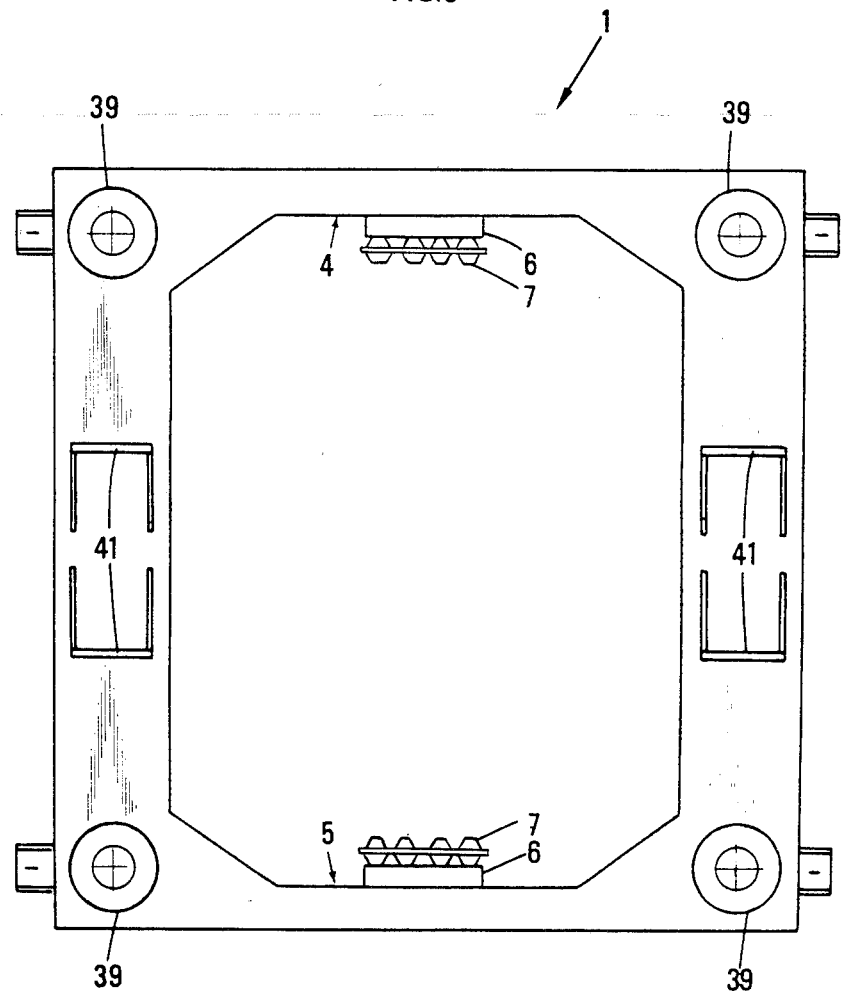

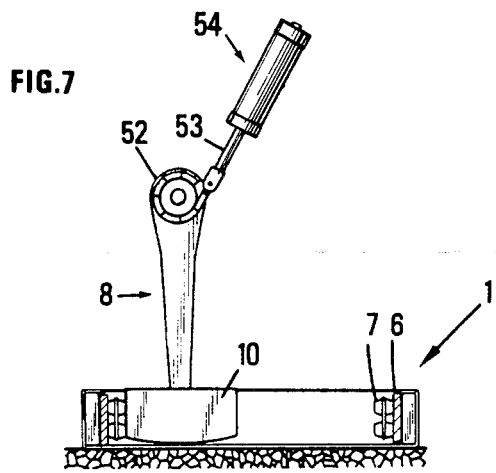
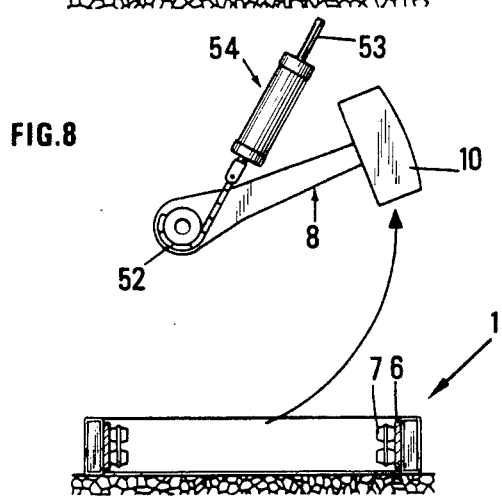
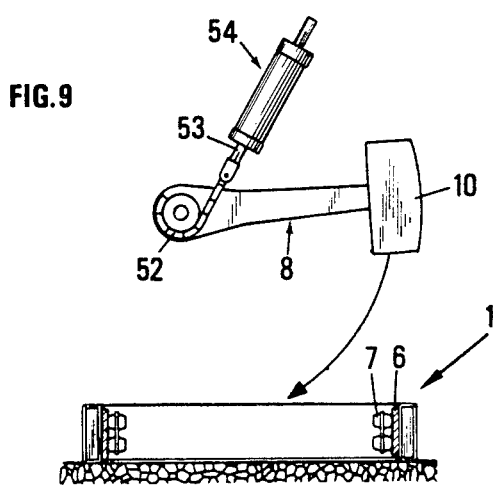

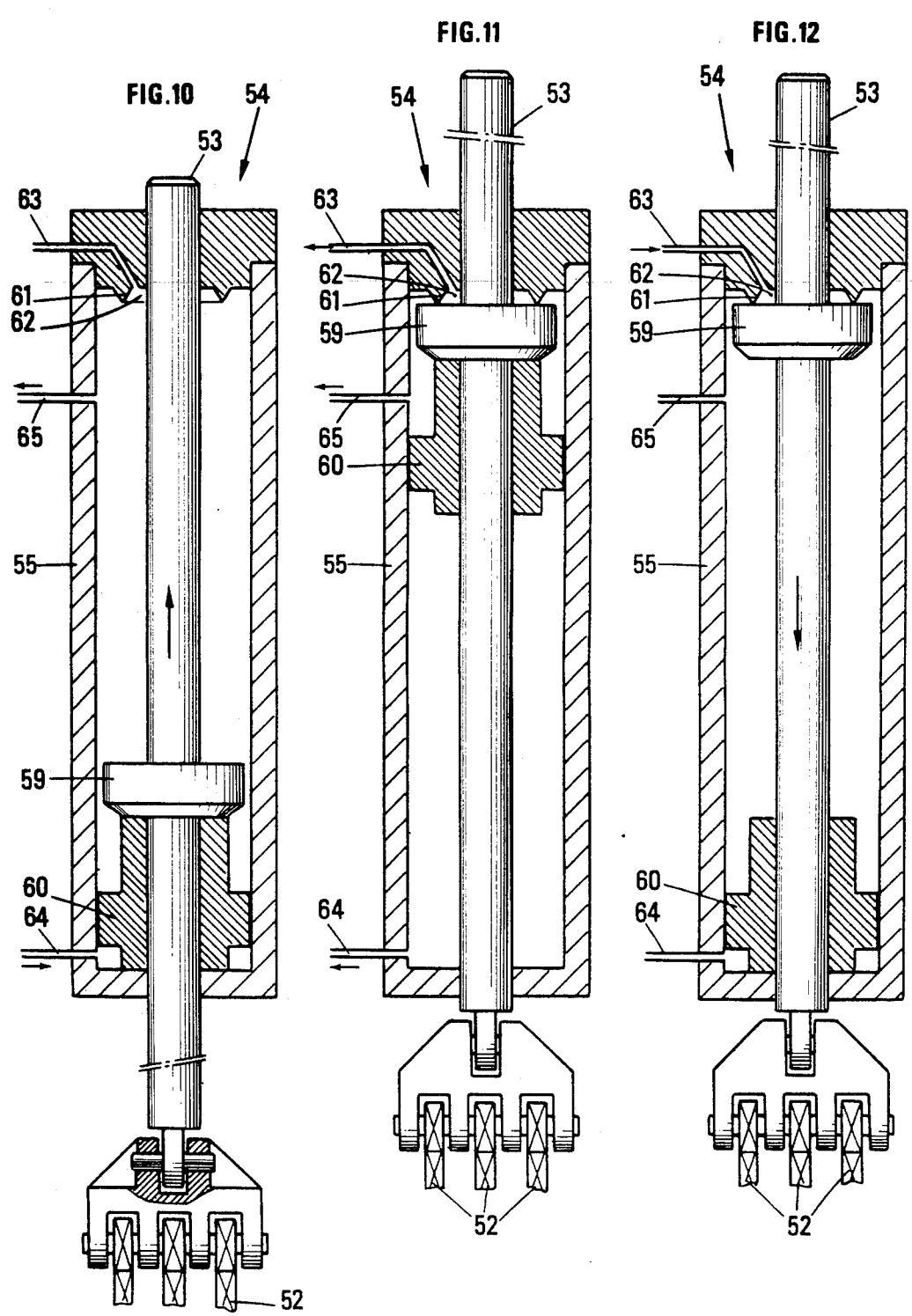

DEVICE FOR GENERATING ACOUSTIC SHEAR WAVES IN THE EARTH

BACKGROUND OF THE INVENTION

This invention has as an object provide an improved device for generating acoustic shear waves in the earth, particularly useful in the field of seismic prospecting.

In seismic prospecting, the location of the reflecting layers of the subsoil is often determined by transmitting through the earth longitudinal acoustic waves (P waves) which propagate according to a compression mode. But there is also used transverse or shear waves (S waves) which propagate according to a distortion or shear mode. The shear waves have interesting applications since their wave length is, at equal frequency, lower than that of the longitudinal waves and they have a better resolving power. In addition, some of them (SH waves) have the particularity, in certain conditions, of being not subjected to any conversion in the presence of stratigraphic discontinuities and the recordings obtained from said waves are simpler.

A known device, adapted to generate acoustic shear waves in the earth, is described, for example in the French Pat. No. 2 276 599. It essentially comprises a target member provided with a surface coupled to the earth and at least one striking lateral surface substantially perpendicular to that coupled with the earth, a mass for striking the target member, a rigid arm pivotable with respect to a platform for supporting the mass and guiding its fall along a circular trajectory towards the lateral surface, and operating means for lifting the mass, by pivotation of the rigid arm with respect to the platform, from a lower position, where the mass is in contact with the lateral striking surface, to an upper position, wherefrom the mass falls. The target-member is connected through deformable coupling means to the lower part of a supporting rigid structure displaceable with respect to the frame of the carrying vehicle between a lower position where the target-member is in contact with the earth to an upper position for transportation.

The target-member being laid down onto the earth, the mass, previously lifted by pivotation of the arm, is released and strikes the lateral surface of the target-member. The impact generates acoustic shear waves which are transmitted to the earth. In order to improve the efficiency of the device, the coupling of the target-member with the earth-surface is enhanced by application of a vertical force thereto. For this purpose, the target-member comprises, at its upper part, roller paths whose spacing is adapted to that of the vehicle axles. The target-member which has been transported to the selected triggering location, is laid down on the earth, then the vehicle is moved so that its rear wheels bear on the roller paths. Once the seismic "shots" have been effected at the selected location, the vehicle is moved again so that its rear wheels release the target-member and comes back to the position required for securing again the rigid structure of the support to the target-member and hoists up the latter to its transportation position. It results from the used coupling mode that the repetition frequency of the successive triggerings of the device at separate locations is essentially limited by the time required for moving the target-member.

SUMMARY OF THE INVENTION

The device according to the invention avoids the above-mentioned disadvantages. It is characterized in that the rigid structure consists of a cage comprising at its upper part an assembly for supporting the platform, the associated pivoting arm as well as the means for operating the rigid arm, the target-member being connected to the lower part thereof, and said lateral striking surface being an inner wall of said target-member.

The target-member, the rigid arm associated to the mass and the means for operating the arm being connected to a rigid cage displaceable between a position where the target-member is pressed again the earth (by an anchoring force consisting for example of a portion of the vehicle weight) and a lifted position enabling the vehicle to move, the time interval between two successive triggerings at two different locations is, accordingly, considerably reduced.

The prior above-mentioned device comprises a target-member whose striking surface is external and a rigid arm adapted to laterally pivot from the vertical to its operating position. The area wherethrough passes the arm during the fall of the mass being accordingly outside the vehicle and being of free access, the operation of the device may imply certain dangers. In addition, the lifting of the arm outside the vehicle, increases the total transverse size of the device working zone, making difficult or impossible the access of the vehicle to certain places which are however adapted to the needs of seismic prospecting (e.g. in certain urban zones).

The device according to the invention avoids these disadvantages. For this purpose the pivoting axle of the arm is secured to the platform so that the mass, in the low position of the arm, comes in contact with the inner striking surface and the respective sizes of the rigid arm, of the platform and of the operating means are so selected that the displacements of the mass are circumscribed inside a volume defined by the cage and the vehicle frame.

The target-member may comprise two opposite striking surfaces consisting of two inner walls facing each other.

The device also comprises rotation means for rotating the platform with respect to the support assembly at the upper part of the cage, between two opposite positions where the pivotation plane of the rigid arm is perpendicular to the inner striking surfaces of the target-member.

These arrangements make it possible to reduce the lateral size of the working zone and to limit the dangerous zones to the inside of a space whose limits are well materialized.

BRIEF DESCRIPTION OF THE DRAWINGS

Other characteristics and advantages of the device will be made apparent from the following description of a preferred embodiment, selected as non limitative example and given with reference to the accompanying drawings wherein:

FIG. 6 is a view from above of the target-member;

FIG. 7 diagrammatically shows the rigid arm in lower position, the mass being in contact with one of the striking surfaces of the target-member, the hydraulic jack forming part of the arm operating means being in extended position;

FIG. 8 diagrammatically shows the rigid-arm in upper position, the hydraulic jack forming part of the operating means being in retracted position;

FIG. 9 diagrammatically shows the rigid arm associated with the operating means, in an intermediary position during the fall of the mass towards a striking surface of the target-member;

FIG. 10 is a cross-sectional view of the operating hydraulic jack in the position shown in FIG. 7;

FIG. 11 is a cross-sectional view of the same jack in the position illustrated in FIG. 8; and FIG. 12 is a cross-sectional view of the same jack, also in the position shown in FIG. 7, but after the intermittently blocking system of the rigid arm has been actuated.

DETAILED DISCUSSION OF THE INVENTION

The device shown in FIGS. 1 to 6 comprises a target-member 1 of rectangular shape, recessed in its central portion (FIG. 6), and consisting, for example, of a rigid assembly of metal beams, this target-member being provided with a surface 2 for application onto the earth.

Figure 1:
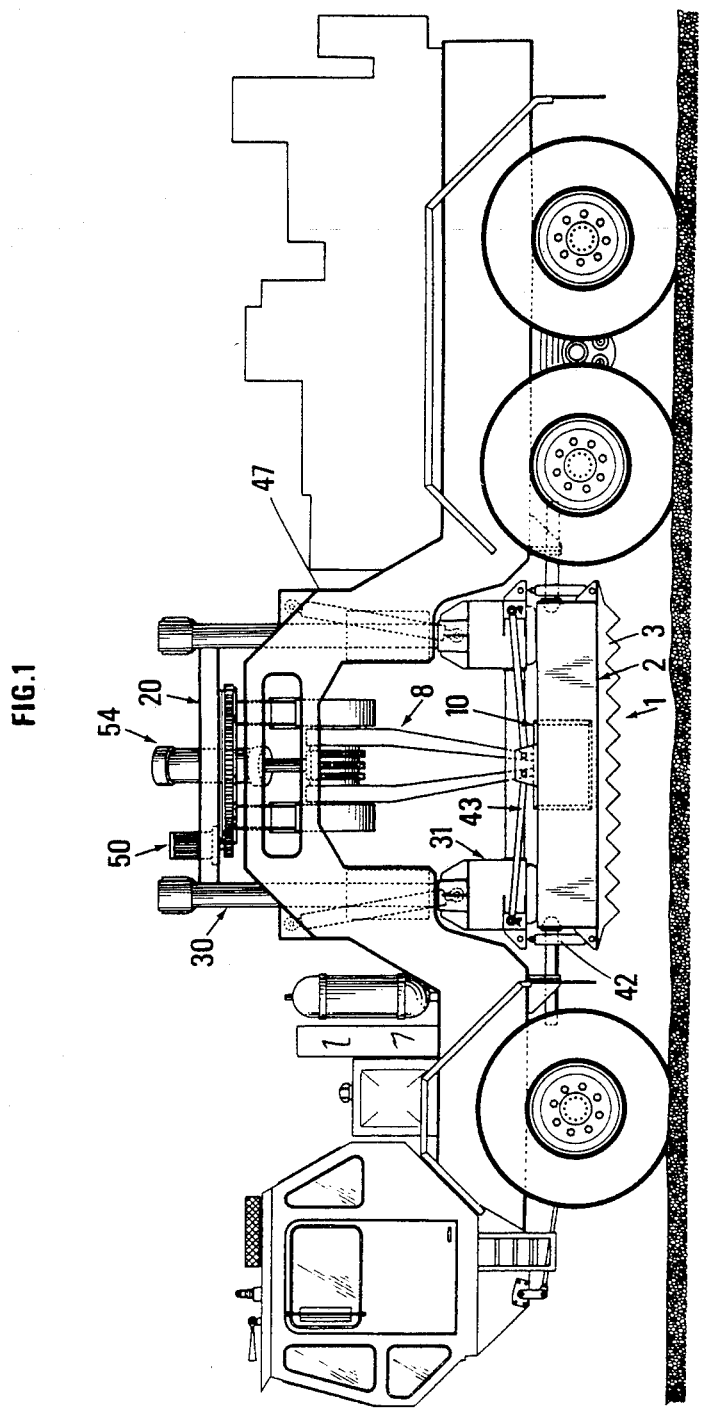
FIG. 1 is an overall view of the device associated with a vehicle, the rigid cage which supports the target-member, the rigid arm, the platform and the operating means, being in lifted position.
Figure 2:
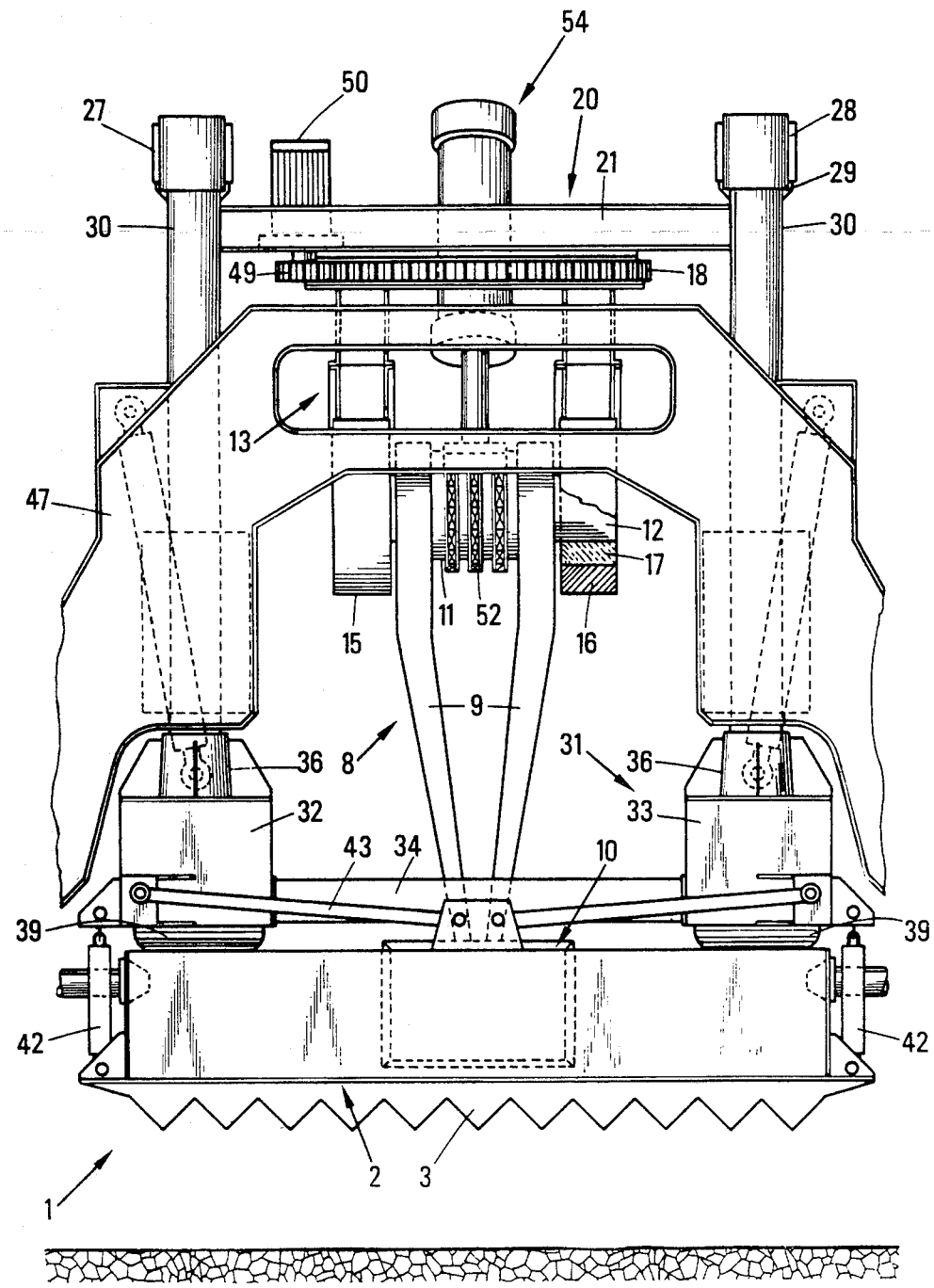
FIG. 2 is a partial view of the device of FIG. 1.

Coupling elements 3, consisting of pins or protrusions, may be optionally secured to the wall 2 of application to the earth so as to increase the coupling coefficient of the target-member with the earth. Two inner walls 4 and 5 (FIG. 3) of the latter, facing each other and perpendicular to the application surface 2, are provided with metal striking plates 6. Damping elements 7 of polyurethane are preferably secured on the striking plates 6. The device also comprises a rigid arm 8 constituted of two elongate elements 9 spaced with respect to each other (FIG. 2). A first end of each of these elements is secured to a mass 10. At their opposite end, the two elements 9 are joined through a cylindrical part 11. An axle 12 integral with the arm 8 passes throughout the two elements 9 and the cylindrical part 11. The device also comprises a platform 13 formed of a plate 14 (FIG. 3) and of two support elements of flanges 15 and 16 (FIG. 2) perpendicular to the plate 14 and integral therewith. At the vicinity of their end opposite to plate 14, each of the two flanges comprises a circular housing for two discs 17 (FIG. 2) made of a damping material (e.g. polyurethane), themselves provided at their center with a housing for one of the ends of axle 12 integral with the arm 8. To the plate 14 is secured a toothed crown 18 adapted to rotate with respect to a supporting annular member 19 (FIG. 3) through ball bearings (not shown), this annular member forming part of a first rigid rectangular support structure 20 also comprising (FIGS. 3, 4, 5):

an assembly of two beams 21 and 22 rigidly secured to each other at their ends by means of two other beams 23 and 24 and, in intermediary positions, by two beams 25 and 26. The annular support member 19 is secured to the two beams 25 and 26; and two beams 27 and 28 parallel to beams 23 and 24 and respectively secured thereto through frustroconical members 29 also made of a damping material.

Four tubular columns 30 are rigidly secured to the ends of the two beams 27 and 28 and perpendicularly to the plane formed therewith. These four columns are secured at their second end to a second supporting rigid structure 31 of rectangular shape formed of two rigid parallel beams 32 and 33, made integral with each other by means of two tubular braces 34 and 35 (FIGS. 2, 3) through connecting members 36. The assembly of the two rigid structures 20 and 31 and the four columns 30 constitutes the rigid cage.

Each of the rigid beams 32 and 33 of the second rigid structure comprises (FIG. 4) a first bearing partition 37 and a second bearing partition 38, perpendicular to the first one. Deformable enclosures 39, formed, for example, of bags of flexible material filled with compressed air are secured, on the one hand, at two different locations to each of the bearing partitions 37 and, on the other hand, to the upper wall of the target-member 1 at the four corners thereof, (FIG. 6) so as to form a first elastic coupling between the target-member and the cage along a first direction. Similarly, identical deformable enclosures 40 (FIG. 4) are secured, on the one hand, at two separate locations, to each of the bearing partitions 38 and, on the other hand, to the bearing walls 41 (also in FIG. 6), parallel to the striking plates (6) of the target-member and integral therewith, so as to form a second elastic coupling between the target-member and the cage along a direction parallel to the pivotation plane of the hammer and orthogonal to said first direction. Sheathed chains 42 (FIG. 2) are secured, on the one hand, to the target-member and, on the other hand, to the second rigid structure 31 of the cage to limit the vertical stretching of the deformable enclosures 39 when they support said target-member 1. Torsion bars 43 are secured to the second rigid structure 31 and to stop members 44 integral with the target-member, so as to prevent any movement of the latter in a direction orthogonal to the pivotation plane of the arm (vehicle axis).

The second rigid structure of the cage is provided with two fastening members 45 (FIGS. 4, 5) integral with beams 32 and 33 at the middle thereof, to which are secured the rods of two jacks 46 (driving means). Damping members 66 (FIG. 4) may be secured to the fastening members 45, on the walls thereof facing the bearing plates 41, to limit the lateral displacement of the target member with respect to the second rigid structure of the cage and to avoid an excessive deformation of the coupling means (deformable enclosures 39 and 40). The bodies of the two jacks are connected to the frame 47 of a vehicle. A hydraulic system carried by the vehicle (and not shown) feeds the two jacks 46 with pressurized liquid.

Four sleeves 48, associated to the frame 47, are used to guide the four columns 30 when the jacks 46 are actuated.

The device further comprises a toothed wheel 49 (FIG. 2) adapted to mesh with the toothed crown 18 and driven in rotation by a motor 50 secured to the first rigid structure 20 of the cage.

The means for operating the rigid arm 8 comprises:

three toothed wheels 51 (FIGS. 3, 4) integral with the cylindrical part 11, three chains 52 meshing with the three toothed wheels 51 and connected at one of their ends to the rod 53 of a jack 54 whose body 55 is secured to an axle 56. The plate 14 of platform 11 is provided with an opening 57 (FIG. 5) for the passage of the jack body 54 and with two bearings 58 adapted to support the axle 56 secured to the jack body 55.

Inside body 55 of jack 54 (FIGS. 10 to 12), the rod 53 is integral with a flap 59. The cross-section of the latter is smaller than that of the jack body. Between the flap 59 and a first end of the body, on the side where the rod 53 is secured to chains 52, is provided a free piston 60 adapted to slide tightly inside the jack body. The end wall of the body at the second end thereof is provided with a seat 61 of cross-sectional area smaller than that of the flap, on which the latter abuts in retracted position of the rod 53. The seat 61 comprises a recess 62 communicating with the already mentioned hydraulic system through a duct 63. The free piston is adapted to move from a first position at the first end of body 55 (FIG. 10) to a second position where it abuts against the flap 59, the latter being in contact with the seat 61 (FIGS. 11, 12). Two ducts 64 and 65, respectively opening in the two opposite end parts of the body and also communicating with the hydraulic system, are provided for injecting liquid under pressure inside the jack and make the free piston to slide between its two limit positions.

The sizes of the platform 13 and the length of the rigid arm 8 are adapted to the sizes of the cage and to those of the target-member so that, for two positions of the axle 12 of the arm symmetrical with respect to the longitudinal plane of the vehicle (positions shown in FIGS. 3, 4) the mass is, in lower position, in contact with one of the striking plates 6 of the target-member or of the corresponding damping element 7. Moreover, the length of the ridig arm 8 is so selected that the displacements of the mass 10 are circumscribed inside a volume defined by the cage and the vehicle frame.

The angle of the rigid arm with a vertical line, when in upper position, may be modified so as to change the impact force. According to a preferred embodiment, the variation of the pivotation angle of the mass is obtained by unfastening the flap seat 61 from the wall of the jack body. Hydraulic means are used to move it from a first position at the bottom of the jack body to a second predetermined position defined by a stop member integral with the lateral wall. The first position corresponds to the maximum pivotation angle, the second to the minimum pivotation angle. By way of example, these angles may be respectively of 117° and 88°. Any upper position may be selected within said angular sector by displacing the seat to an intermediary location and by locking it mechanically by means of spacers of convenient sizes.

According to another embodiment, the maximum pivotation angle of the rigid arm 8 may be modified by adding (or removing) one or more links to chains 52.

Figure 4:
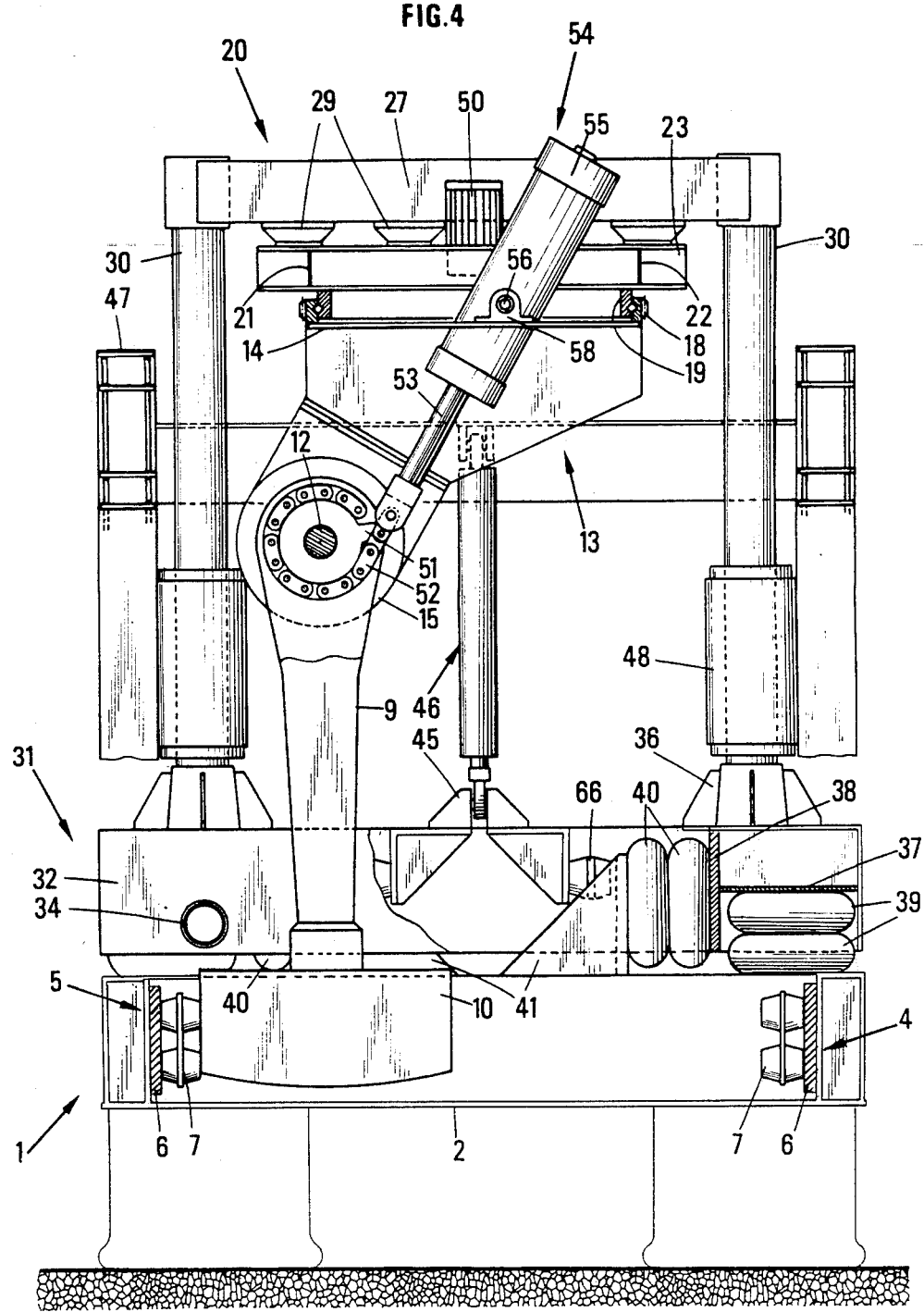
FIG. 4 is a cross-sectional transverse view of the device, the pivotation plane of the rigid-arm being in a second position symmetrical of the first one and the target-member being in lifted position, showing deformable coupling means.
Figure 5:
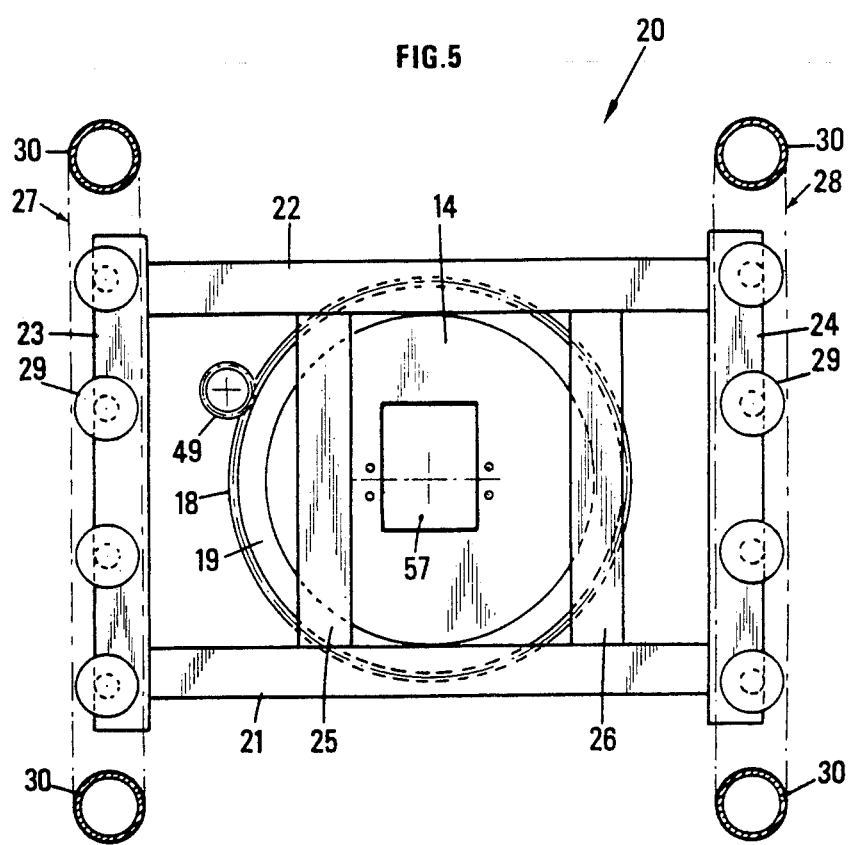
FIG. 5 is a diagrammatic view from above of the cage supporting the platform rotation means.

The device operates as follows:

once the vehicle has been driven to a selected location for effecting seismic "shots", the target-member being in upper position (FIGS. 1, 2), the two jacks 46 are actuated to lower the rigid cage from its upper positions (second position) to its lower position (first position) at which the target-member 1 abuts against the earth surface. Preferably a sufficient hydraulic pressure is applied to both jacks so that a part of the vehicle adds its weight to the target-member in working position, in order to obtain a good acoustic coupling;

the motor 50 is actuated so as to drive in rotation the platform and bring the pivotation arm to a first position (FIGS. 4 and 7, for example). The arm 8 being in lower position, the mass 10 is in contact with the damping element 7 of one of the striking plates 6 of the target-member. The rod 53 of the operating jack 54 is then in its extended position (FIG. 10) at which the flap 59 takes its bearing against the free piston 60, which is in its first position at a first end of body 55;

liquid under pressure is introduced through duct 64 so as to push the free piston 60 towards its second position. During its displacement, the latter drives therewith the flap 59 and the jack rod 53 with the effect of pulling on the chains 52 and causing pivotation of the rigid arm to its upper position (FIG. 8) at which the flap takes its bearing against its seat 61 and the free piston 60 is in contact with the flap (FIG. 11);

a high hydraulic pressure is then applied through duct 65 and simultaneously a lower pressure is applied to ducts 63 and 64, with the effect of pressing the flap 59 against its seat 61 and moving the free piston back to its first position (FIG. 12); and a liquid at a pressure higher than that prevailing in the body 55 between the free piston 60 and the flap 59, is injected in the recess 62 of the seat 61, through duct 63, so as to release the flap from its seat 61. The pressures applied respectively on both sides of the flap are then equalized. The hydraulic liquid freely flowing from one side to the other of the flap as a result of the section thereof being lower than that of body 55, the braking force developed by the jack 54 during the sliding stroke of its rod is substantially nill, so that the mass may freely fall down to its lower position at which it impinges the striking plate 6. As a result of the lateral shock applied to the target-member secondary seismic waves are transmitted to the earth. The deformable coupling means consisting of the inflated bags 39 and 40 avoids that the shocks applied to the target-member be transmitted to the rigid cage and to the vehicle frame.

Figure 3:
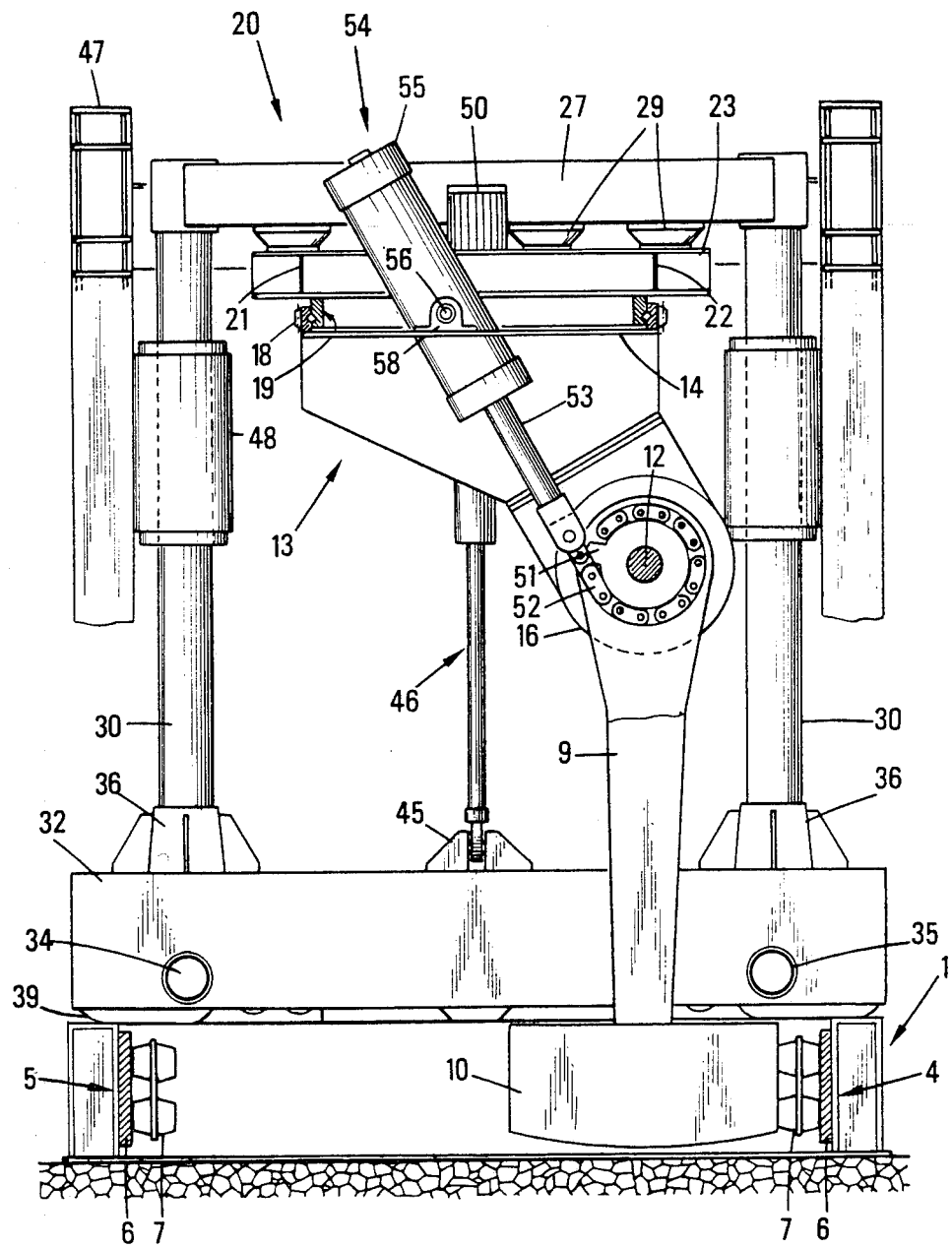
FIG. 3 is a cross-sectional transversal view of the device, the pivotation plane of the rigid arm being in a first position and the target-member being in working position.

When it is desired to apply to the earth seismic shear waves of a polarity opposite to those previously generated, the motor 50 is actuated so as to drive in rotation the platform 13 by 180° to the symmetrical position shown in FIG. 3, where the mass is in contact with the other striking surfaces 6 or its damping element 7 and the different steps of operating the arm 8 and its lifting jack 54 are repeated in an identical manner.

The "shot" and seismic data acquisition operations being effected at a determined place, the motor means (jacks 46) are actuated to move the cage to its lifted position (FIG. 1) and the vehicle is driven to a new selected place.

Preferably, the device comprises a control system adapted to perform automatically all the different operations of the cage and the rigid arm. It would not be outside the scope of the invention to replace the air bags 40 (cf. FIG. 4) by bellows filled with compressed air, whose lateral wall is deformable, the axis of the belows being oriented parallelly to the pivotation plane of the rigid arm.

What is claimed is:

1. A device mounted on a vehicle frame for generating acoustic shear waves in the earth, comprising a target member having an earth coupling surface, an upwardly facing surface, and at least one inner facing wall forming a lateral striking surface substantially perpendicular to said coupling surface; a mass for striking the target-member, a platform for supporting the mass, a rigid arm pivotable with respect to the platform for supporting the mass and guiding the fall of the mass along a circular trajectory towards said lateral striking surface, and operating means for lifting the mass by pivoting the rigid arm with respect to the platform from a lower position where the mass is in contact with the striking lateral surface to an upper position wherefrom the fall is initiated; a rigid cage comprising an assembly for supporting the platform, four vertical columns and a lower frame having downwardly facing surfaces and vertically extending surfaces the target-member being connected through deformable coupling means disposed between the target-member and both the downwardly facing walls and vertical walls to the lower frame of the rigid cage and being displaceable with respect to the vehicle frame from a position where the target-member is in contact with the earth to a lifted position, the assembly for supporting the platform also supporting the associated pivoting arm, and rigid arm operating means; an axle about which the arm pivots being secured to the platform so that the mass, in the lower position of said arm, comes into contact with the inner striking surface; the sizes of the rigid arm, of the platform and of the operating means being selected so as to maintain the displacements of the mass within a space defined by the cage and the vehicle frame and two hydraullic jacks disposed between the vehicle frame and cage for displacing the cage and target member with respect to the vehicle frame.

2. A device for generating acoustic shear waves in the earth, comprising a target-member having an earth-coupling surface and two striking lateral surfaces substantially perpendicular to said coupling surface, a mass for striking the target-member, a rigid arm pivotable with respect to a platform for supporting the mass and guiding its fall along a circular trajectory towards said lateral surface, operating means for lifting the mass by pivoting the rigid arm, with respect to the platform, from a lower position where the mass is in contact with the striking lateral surface to an upper position wherefrom the fall is initiated, the target-member being connected through deformable coupling means to the lower part of a supporting rigid structure displaceable, with respect to the frame of a vehicle, from a position where the target-member is in contact with the earth and a lifted position, wherein the rigid structure is a cage comprising at its upper part an assembly for supporting the platform, the associated pivoting arm, as well as the rigid arm operating means, the target-member being connected to its lower part and said striking lateral surface being two inner walls of said target-member facing each other, an axle about which the arm pivots being secured to the platform so that the mass, in lower position of said arm, comes into contact with the inner striking surface, the sizes of the rigid arm, of the platform and of the operating means being selected so as to maintain the displacements of the mass within a space defined by the cage and the vehicle frame, and said device further comprising means for driving in rotation the platform with respect to the support assembly at the upper part of the cage between two opposite positions, wherein the means for driving in rotation the platform comprises a toothed crown secured to the platform which is provided with support plates, the pivotation axle of the rigid arm being secured to the support plates through discs made of a deformable material, and a motor for driving a toothed wheel for rotating the toothed crown, and wherein the pivotation plane of the rigid arm is perpendicular to the inner striking surfaces of the target-member.

3. A device according to claim 1, wherein a shock damping element is secured to each lateral striking surface of the target-member.

4. A device according to claim 1, wherein the deformable coupling means are bellows filled with compressed air and and having lateral walls which are deformable.

5. A device for generating acoustic shear waves in the earth, comprising a target-member having an earth-coupling surface and at least one striking lateral surface substantially perpendicular to said coupling surface, a mass for striking the target-member, a rigid arm pivotable with respect to a platform for supporting the mass and guiding its fall along a generally circular trajectory towards said lateral surface, and operating means for lifting the mass by pivoting the rigid arm, with respect to the platform, from a lower position where the mass is in contact with the striking lateral surface to an upper position wherefrom the fall is initiated, the target-member being connected through deformable coupling means to the lower part of a supporting rigid structure displaceable, with respect to the frame of a vehicle, from a position where the target-member is in contact with the earth and a lifted position, wherein the rigid structure is a cage comprising at its upper part an assembly for supporting the platform, the associated pivoting arm, as well as the rigid arm operating means, the target-member being connected to its lower part and said striking lateral surface being an inner wall of said target-member, an axle about which the arm pivots being secured to the platform so that the mass, in lower position of said arm, comes into contact with the inner striking surface, with the sizes of the rigid arm, of the platform and of the operating mean being selected so as to maintain displacements of the mass within a space defined by the cage and the vehicle frame, and the cage comprising four columns rigidly connecting the support assembly with the rigid structure and being made displaceable by two jacks, secured to the frame of the vehicle, whose rods are connected to the rigid structure of the cage, both jacks being fed through a hydraulic system, and said device further comprising deformable coupling means provided between the upper surface of the target-member and walls parallel to the earth-coupling surface, of a rigid structure at the lower part of the cage, and coupling means provided between walls of the target-member and of the rigid structure parallel to the lateral striking surface, said coupling means comprising enclosures of deformable material filled with compressed air and associated with means for limiting the displacement of the target-member with respect to the second structure of the cage.

6. A device for generating acoustic shear waves in the earth, comprising a target-member having an earth-coupling surface and at least one striking lateral surface substantially perpendicular to said coupling surface, a mass for striking the target-member, a platform, a rigid arm pivotable with respect to a platform for supporting the mass and guiding its fall along a circular trajectory towards said lateral surface, operating means for lifting the mass by pivoting the rigid arm, with respect ot the platform, from a lower position where the mass is in contact with the striking lateral surface to an upper position wherefrom the fall is initiated, the target-member being connected through deformable coupling means to the lower part of a supporting rigid structure displaceable, with respect to the frame of a vehicle, from a position where the target-member is in contact with the earth and a lifted position wherein the rigid structure is a cage comprising at its upper part an assembly for supporting the platform, the associated pivoting arm, as well as the rigid arm operating means, the target-member being connected to its lower part and said striking lateral surface being an inner wall of said target-member, and wherein the operating means comprises a jack body secured to the platform, at least one chain meshing with a toothed wheel integral with an axle about which the arm pivots and secured to a jack rod having a flap displaceable inside its body, the cross-sectional area of the body being greater than that of the flap, between a first position and a second position corresponding respectively to the lower and upper positions of the rigid arm, a free piston located between the end of the body which is nearer to the chain and the flap and adapted for driving the latter to its second position, a hydraulic system communicating with the jack body for moving the free piston, and means cooperating with the hydraulic system for intermittently fixing the flap in its second position.

7. A device according to claim 6, wherein the means for intermittently fixing the flap in its second position comprises a flap seat displaceable inside the jack body by action of hydraulic means, and in that the length of the chain is adapted for effecting the total pivoting angle of the rigid arm between its upper position and its lower position.

8. A device according to claim 6, wherein the platform is integral with a toothed crown adapted to rotate with respect to the rigid structure, the crown being driven in rotation by motor means.

* * * * *